(12) United States Patent
Konfaty et al.

(10) Patent No.: US 8,041,920 B2
(45) Date of Patent: Oct. 18, 2011

(54) PARTITIONING MEMORY MAPPED DEVICE CONFIGURATION SPACE

(75) Inventors: David A. Konfaty, Portland, OR (US); John I. Garney, Portland, OR (US); Ulhas Warrier, Beaverton, OR (US); Kiran S. Panesar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1102 days.

(21) Appl. No.: 11/618,450

(22) Filed: Dec. 29, 2006

(65) Prior Publication Data

US 2008/0162865 A1  Jul. 3, 2008

(51) Int. Cl.
*G06F 12/00* (2006.01)
(52) U.S. Cl. .......................... 711/173; 711/129; 711/137
(58) Field of Classification Search ................... 711/173, 711/129, 137
See application file for complete search history.

(56) References Cited

U.S. PATENT DOCUMENTS

2002/0186711 A1* 12/2002 Masuyama et al. ........... 370/468

* cited by examiner

*Primary Examiner* — Yong Choe
(74) *Attorney, Agent, or Firm* — Thomas R. Lane

(57) ABSTRACT

Embodiments of apparatuses, methods, and systems for partitioning memory mapped device configuration space are disclosed. In one embodiment, an apparatus includes a configuration space address storage location, an access map storage location, and addressing logic. The configuration space address storage location is to store a pointer to a memory region to which transactions to configure devices in a partition of a partitioned system are addressed. The access map storage location is to store an access map or a pointer to an access map. The addressing logic is to use the access map to determine whether a configuration transaction from a processor to one of the devices is to be allowed.

7 Claims, 4 Drawing Sheets

Method 400

PARTITIONING MEMORY MAPPED DEVICE CONFIGURATION SPACE

BACKGROUND

1. Field

The present disclosure pertains to the field of information processing, and more particularly, to the field of partitioning information processing systems.

2. Description of Related Art

Generally, the concept of partitioning in information processing systems refers to dividing a system into partitions, where each partition is a group of system resources that may be operated as a complete and independent system. The system resources that may be allocated to a partition include processors, processor cores (where individual cores of a multicore processor may be allocated to different partitions), portions of system memory, and input/output ("I/O") devices. Different types of partitioning are known.

In "soft" partitioning, system resources may be shared between partitions. One form of soft partitioning is virtualization, which allows multiple instances of one or more operating systems (each, an "OS") to run on a single system, even though each OS is designed to have complete, direct control over the system and its resources. Soft partitioning typically requires that a virtual machine monitor, hypervisor, OS, or other such software is designed to run in one partition of a partitioned system and enforce the sharing of physical resources, which may include preventing any such software running in other partitions from directly controlling physical resources.

In "hard" partitioning, each system resource is typically dedicated to a respective partition. Hard partitioning provides for any OS, virtual machine monitor, hypervisor, or other such software to be run in each partition without requiring that the software be designed for a partitioned system, because such software may directly control the physical resources of its partition.

BRIEF DESCRIPTION OF THE FIGURES

The present invention is illustrated by way of example and not limitation in the accompanying figures.

DETAILED DESCRIPTION

The present invention may be embodied in apparatuses, methods, and systems for partitioning memory mapped device configuration space as described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or expression that is implemented or embodied in a hardware structure (e.g., flash memory or read only memory). Examples of firmware are microcode, writable control store, and micro-programmed structure.

Figure 1:
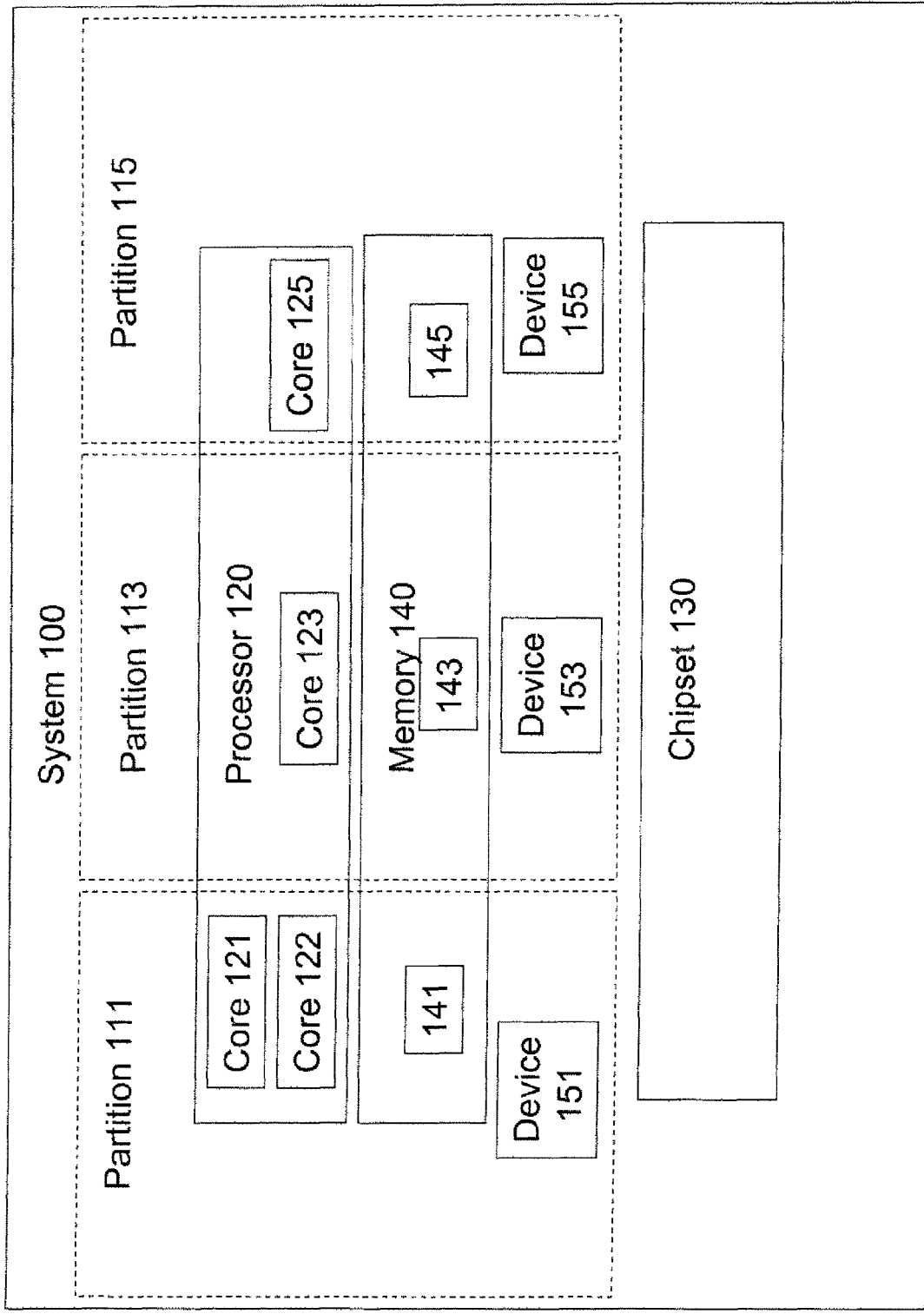
FIG. 1 illustrates an embodiment of the present invention in a partitioned information processing system.

FIG. 1 illustrates an embodiment of the present invention in partitioned information processing system 100. Information processing system 100 may be personal computer, a mainframe computer, a portable computer, a handheld device, a set-top box, a server, or any other computing system. In this embodiment, system 160 includes one or more processor packages 120, chipset(s) 130, system memory 140, and devices 151, 153, and 155.

Processor 120 may be any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller, or may be a reconfigurable core (e.g. a field programmable gate array. Although FIG. 1 shows only one such processor 120, system 100 may include any number of processors, including any number of multicore processors, each with any number of execution cores, and any number of multithreaded processors, each with any number of threads. In this embodiment, processor 120 includes cores 121, 122, 123, and 125.

Chipset 130 may be any group of circuits and logic that supports memory operations, input/output operations, configuration, control, internal or external interface, connection, or communications functions (e.g., "glue" logic and bus bridges), and/or any similar functions for processor 120 and/or system 100. Individual elements of chipset 130 may be grouped together on a single chip, a pair of chips, dispersed among multiple chips, and/or be integrated partially, totally, redundantly, or according to a distributed approach into one or more processors, including processor 120.

System memory 140 may be any medium on which information, such as data and/or program code, may be stored, such as static or dynamic random access memory, semiconductor-based read-only or flash memory, magnetic or optical disk memory, or any other type of medium readable by processor 120, or any combination of such mediums.

Devices 151, 153, and 155 may each represent any number of any type of I/O, peripheral, or other devices, such as a keyboard, mouse, trackball, pointing device, monitor, printer, media card, network interface, information storage device, etc. Each of devices 151, 154, and 155 may be embodied in a discrete component, or any one or more of them may be included in an integrated component with any other devices. In one embodiment, devices 151, 153, and 155 may each represent a different function in a multifunctional 110, peripheral, or other device.

Processor 120, chipset 130, system memory 140, and devices 151, 153, and 155 may be coupled to or communicate with each other according to any known approach, such as directly or indirectly through one or more parallel, sequential, pipelined, asynchronous, synchronous, wired, wireless, or other bus or point-to-point connection. System 100 may also include any number of additional devices, agents, components, or connections.

System 100 is partitioned into partitions 111, 113, and 115. Core 121 and 122 of multicore processor 120, portion 141 of system memory 140, and device 151 are allocated to partition 111. Core 123 of multicore processor 120, portion 143 of system memory 140, and device 153 are allocated to partition 113. Core 125 of multicore processor 120, portion 145 of system memory 140, and device 155 are allocated to partition 115. Each partition may also include additional processors, cores, portions of memory, devices, or any other physical resources described above or otherwise known in the art of information processing.

The partitioning of system 100 may be implemented according to any known approach, such as by executing partitioning firmware or software at the time of system initialization to configure the system by assigning hardware resources, including devices, to each partition. A portion of system memory 140 may be assigned to a partition may assigned to a partition according to any number of approaches. For example, a portion of system memory may be assigned to a particular partition by storing one or more lower addresses, upper addresses, and/or offsets in one or more memory range or other registers, other storage locations, or data structure entries corresponding to that partition. These data structures may include access permission indicators to prevent a processor, processor core, or other agent in one core from accessing memory addresses assigned to a different core.

Figure 2:
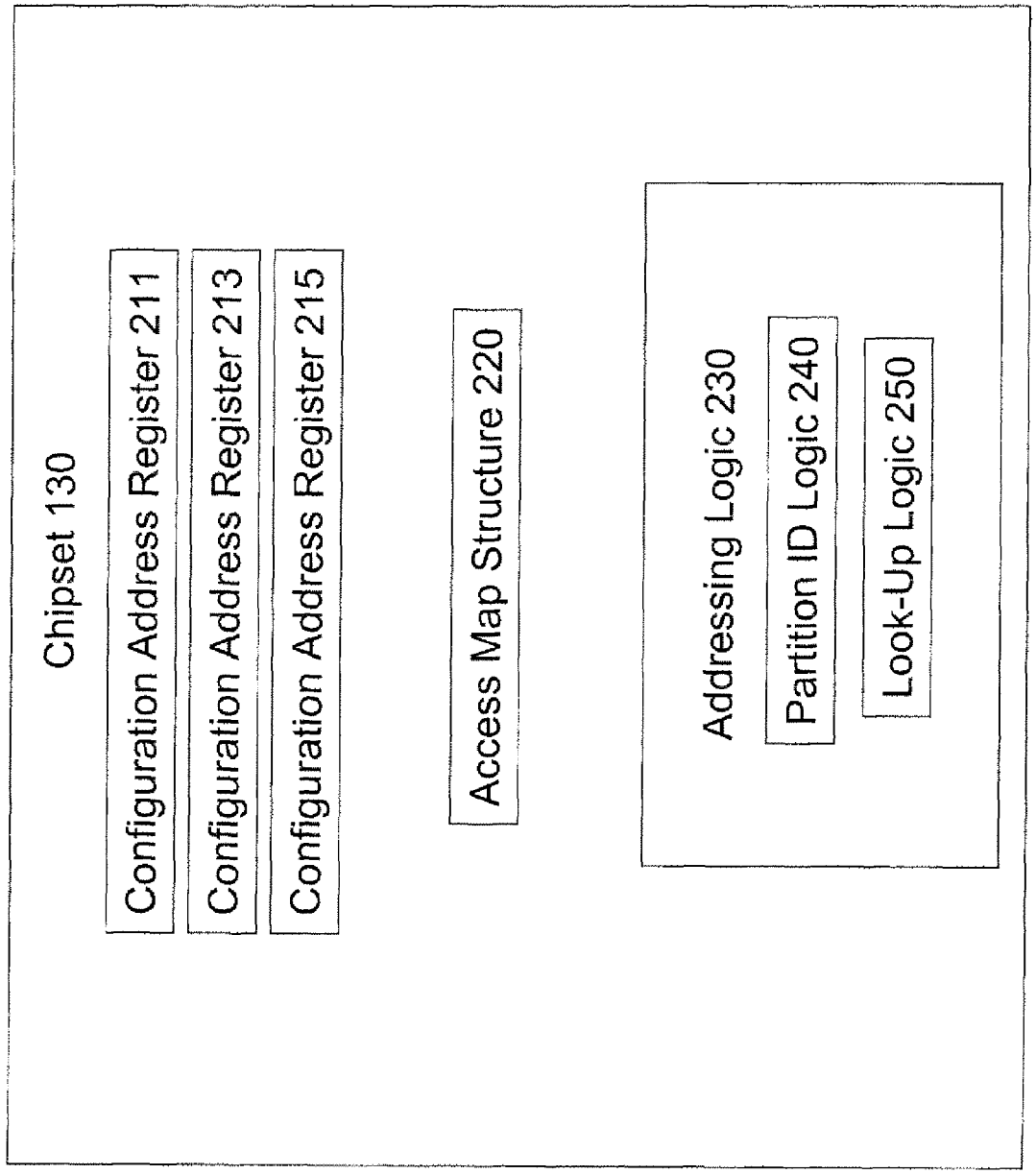
FIG. 2 illustrates an embodiment of the present invention in a chipset.

FIG. 2 illustrates chipset 130, according to one embodiment of the present invention. Chipset 130 includes configuration address registers 211, 213, and 215, access map structure 220, and addressing logic 230. Addressing logic 230 includes partition identification logic 240 and look-up logic 250. Although configuration address registers 211, 213, and 215, access map structure 220, addressing logic 230, partition identification logic 240, and look-up logic 250 are shown in chipset 130 in this embodiment, any one or group of them may be elsewhere in system 100 within the scope of the present invention.

Configuration address registers 211, 213, and 215 may be registers, portions of one or more registers, or any other type of storage location. A configuration address register may store a pointer to an address space in system memory 140 to which memory mapped device configuration transactions are addressed. In one embodiment, where system 100 includes a Peripheral Component Interconnect Express ("PCIe") bus, one such configuration address space may be a 256 MB contiguous, re-locatable portion of system memory 140 used to access the PCIe device configuration space (the "MMCFG" space). Other configuration address spaces in an embodiment including an MMCFG space may be of the same size and arrangement (described below) as the MMCFG space. Other sizes and arrangements of configuration address spaces, including non-contiguous spaces, are possible.

FIG. 2 shows three configuration address registers, one for each partition in system 100, but any number of configuration address registers are possible within the scope of the present invention. Each configuration address register may store a base address of a corresponding configuration address space in system memory 140, where the configuration address spaces are within separate portions of memory 140, where each of the separate portions of system memory are assigned to a different partition.

In this embodiment, configuration address register 211 stores a base address of a configuration address space within portion 141 of system memory 140, which is assigned to partition 111. Configuration address register 213 stores a base address of a configuration address space within portion 143 of system memory 140, which is assigned to partition 113. Configuration address register 215 stores a base address of a configuration address space within portion 145 of system memory 140, which is assigned to partition 115.

The base addresses may be selected and stored in the configuration address registers by a basic input/output system ("BIOS"), a partition manager, other firmware or software, or any combination. For example, BIOS may program the configuration address register 211 with the base address of the MMCFR space, such that the MMCFR space is located between the top of low memory and the bottom of the lowest range that may be used for memory mapped I/O. Then, configuration address registers 213 and 215 may be programmed with a base address for partitions 113 and 115, respectively, corresponding to 256 KB portions of system memory 140 that do not overlap with each other, with the MMCFR space or with any other assigned region of system memory. Each of these 256K portions may be referred to as "V-MMCFR" spaces, configuration address register 211 may be referred to as the MMCFR register, and configuration address registers 213 and 215 may be referred to as V-MMCFR registers.

To accommodate desired sizes and locations of the MMCFR and V-MMCFR spaces, the sizes and locations of portions 141, 143, and 145 of system memory may be assigned accordingly. Each of portions 141, 143, and 145 of system memory may be the same size as the corresponding configuration address spaces, or they may be larger than the corresponding configuration address spaces. Portions 141, 143, and 145 may represent the entire portion of system memory 140 assigned to partitions 111, 113, and 115, respectively, or only a part of it.

Each configuration address space may be arranged according to any approach. In an embodiment including an MMCFG space, the MMCFG space may include a 4 KB area for each possible PCIe device, where, again, "device" may mean a function within a multifunction device. In this or other embodiments, each device may be identified by a unique identifier, such as the bus number, device number, and function number ("BDF") of the device. For example, a 16-bit BDF may include an S-bit bus number, a 5-bit device number, and a 3-bit function number. A BDF or other device identifier may be assigned to a device according to any known convention and/or by system configuration software or firmware. Then, an MMCFG space may be arranged based on BDFs, e.g., the 4K space at the base address may be allocated for bus 0, device 0, function 0, and so on.

Figure 3:
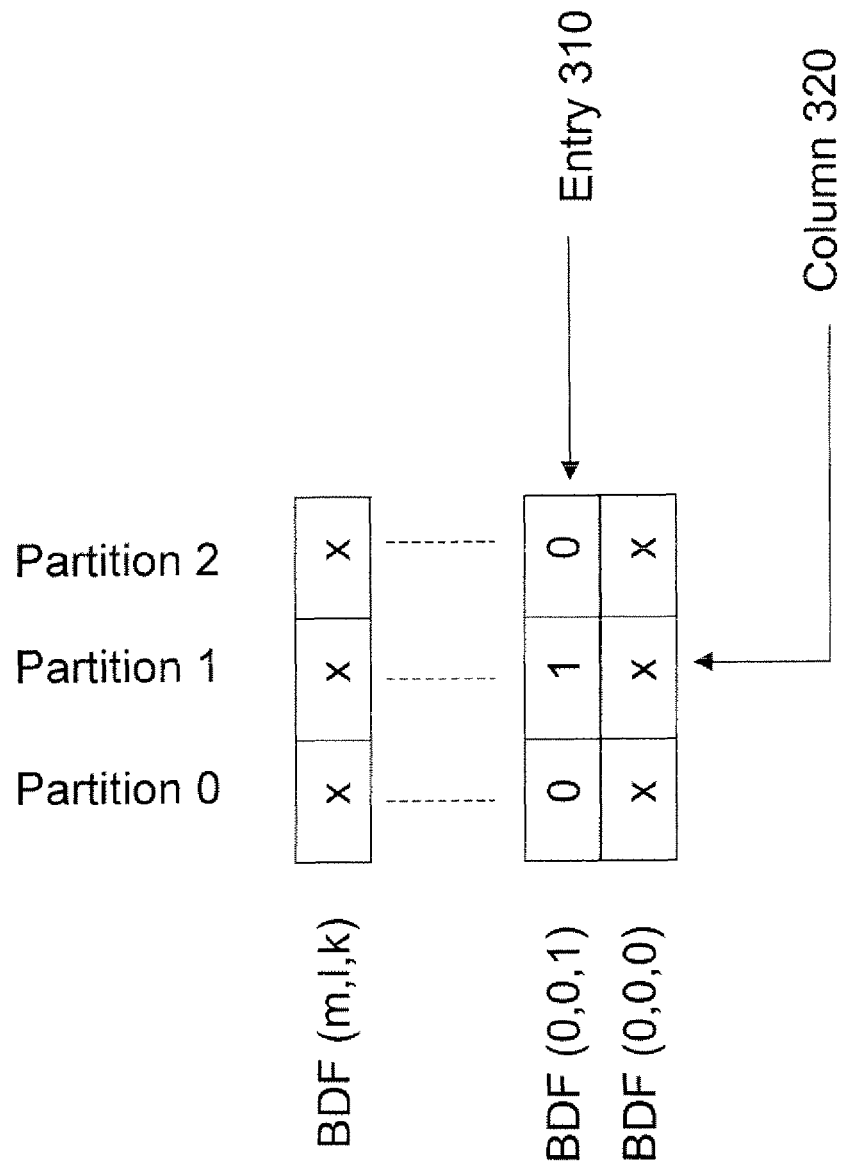
FIG. 3 illustrates an access map according to an embodiment of the present invention.

Access map structure 220 may include a storage location to store a data structure in the form of a table, or in any other form, or a pointer to a location in system memory 140 where a data structure may be located. The data structure, or access map, is used to map a device or a region of device configuration space to one or more partitions. In this embodiment, access map structure 220 includes access table 300 as shown in FIG. 3.

Access table 300 is arranged as one entry, or row, per device unit. In this embodiment the device unit is a BDF, therefore, the number of rows is 64K. In other embodiments, the device unit may be any unit that provides a unique identifier of a function, device, or group of functions or devices, such that the device unit defines the granularity at which devices may be mapped to partitions.

For example, in another embodiment, the device unit may be a bus number and a device number, such that all functions of any device are mapped together. Therefore, the number of rows would be 8K. In another embodiment, the device unit may be a bus number, such that all devices on any bus are mapped together. Therefore, the number of rows would be 256. In another embodiment, a combination of approaches may be used, for example, 256 rows may be provided to accommodate BDF granularity for two buses, and 254 rows may be provided to accommodate per bus granularity for the remaining buses.

Each column of access table 300 corresponds to a partition in system 100. The intersection of each row and each column is a bit that dictates whether a configuration transaction from a particular partition is allowed to access a device. Therefore, access table 300 may be used as a mask to determine whether or not to allow a device configuration transaction is allowed. For example, entry 310 in access table 310 indicates a device configuration access to the corresponding BDF is allowed from the partition corresponding to column 320 but not from the partition corresponding to column 330. The size of such an access table would be the number of device units times the number of partitions, e.g., in system 100, 64K times 3 bits.

Other embodiments of access maps are possible. In one embodiment, an access map may include one column per entry, in which a unique partition identifier is stored. The size of such an access table would be the number of device units times the size of the partition identifier. The size of the partition identifier would be the base 2 log of N, where N is the number of partitions plus one, where the extra one is to indicate a value to indicate that no partitions are allowed access. For example, in system 100, the size of the partition identifier would be the base 2 log of 4, so the size of the access table would be 64K times 2 bits.

In another embodiment, a number of columns are provided to indicate a number of partition identifiers, so that the access table may dictate that configuration accesses from a number of partitions are allowed. In another embodiment, each entry may include or point to an access control list. In this case, the access table may other attributes (e.g., read, write) in addition to permission.

In any of the above embodiments, an access map, including those described as arranged as a table having a certain number of rows and a certain number of columns, may be stored in a data structure in a format other than a table.

In some embodiments, a full access map may be stored in access map storage location 220. In other embodiments, a pointer to an address in system memory 140, where a full access map is stored, may be stored in access map storage location 220. In some embodiments, a portion of a full access map may be stored in storage location 200 and the full access map, or another overlapping or non-overlapping portion, may be stored in system memory 140. For example, where a full access map is stored in system memory 140, access map storage location 220 may include a cache of recently used access map entries.

Addressing logic 230 may include any circuitry, structure, or logic to perform the function of determining whether a device configuration transaction is allowed, to forward those that are allowed to the appropriate bus or device, and to block those that are not allowed. Addressing logic 230 includes partition identification logic 240 to generate a partition identifier based on the address provided by the configuration transaction. Look-up logic 250 is to look-up or find an entry in the access map.

A device configuration transaction or other such communication may originate from any partition in system 100, i.e., from any processor, processor core, or other agent or device assigned to a partition in system 100. The transaction may include an address within a configuration address space in system memory 140. A BDF or other device identifier may be provided in the transaction header or may be otherwise associated with a transaction.

Partition identification logic 240 may generate a partition identifier by comparing the address provided by the transaction to the address in one or more of the device address configuration registers, to determine to which configuration address space the address belongs. For example, if the address is within the 256 MB address space starting at the address stored in address configuration register 213, then the partition identifier would be that which uniquely identifies partition 113.

Look-up logic 250 may find an entry in the access map using the BDF, or other device identifier, associated with the transaction. The contents of the entry, or a sub-entry within the entry, determine whether the transaction is allowed, based on the partition identifier provided by the partition identification logic.

In an embodiment where the access map entry is a mask table, the partition identifier from partition identification logic 240 may be used to find a sub-entry at the intersection of the row defined by the BDF and the column defined by the partition identifier. In an embodiment where the access map entries include partition identifiers, the partition identifier from the partition identification logic may be compared to the contents of the entry or one or more sub-entries (e.g., where a number of sub-entries are provided to indicate a number of partition identifiers, the partition identifier from the partition identification logic may be compared to each sub-entry).

Figure 4:
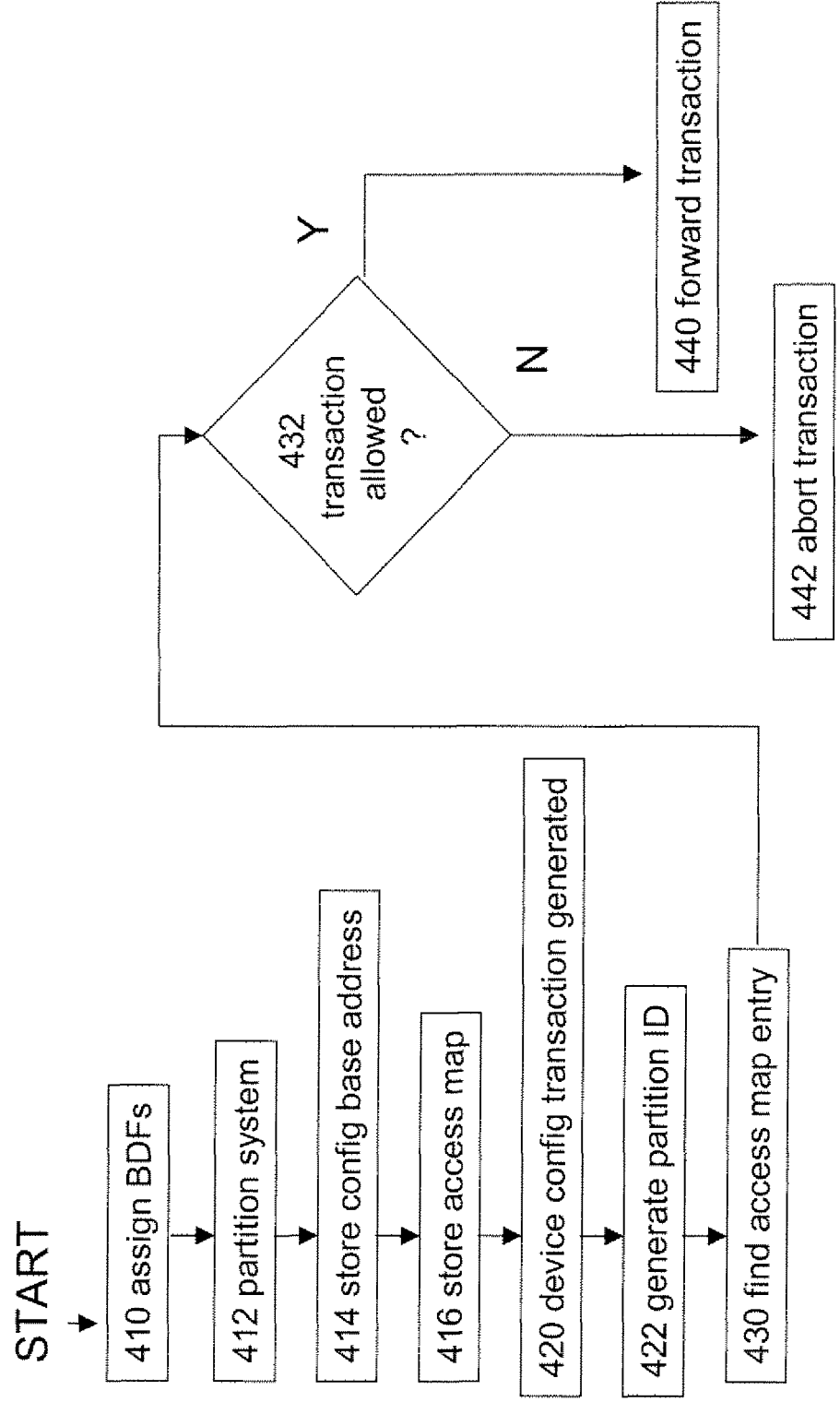
FIG. 4 illustrates an embodiment of the present invention in a method for partitioning memory mapped device configuration space.

FIG. 4 illustrates an embodiment of the present invention in method 400, a method for partitioning memory mapped configuration space. Although method embodiments are not limited in this respect, reference is made to the description of system 100 of FIG. 1 to describe the method embodiment of FIG. 4.

In box 410 of FIG. 4, an information processing system, e.g., system 100, is configured such that each device, or function within a device, is assigned a BDF. In box 412, the system is partitioned. In box 414, a base address for a device configuration address space for a first partition is stored in a device address configuration register. In box 416, an access map based on the system partitioning is stored.

In box 420, a processor core in a partition generates a device configuration transaction. In box 422, a partition identifier is generated based on the address from the transaction. For example, if the address belongs to the address space defined by the device address configuration register referred to in box 414, the partition identifier will refer to the first partition.

In box 430, the device identifier associated with the transaction is used to find an entry in the access map. In box 432, the partition identifier and the access map entry are used to determine whether the transaction is allowed. For example, in an embodiment where the access map is a mask table, the partition identifier may be used to find a sub-entry in the entry that dictates whether the partition corresponding to the sub-entry is allowed to access the device corresponding to the entry.

If the access is allowed, then the transaction is forwarded to the appropriate bus or device in box 440. If the access is not allowed, then the transaction is blocked or aborted in box 442.

Within the scope of the present invention, it may be possible for method 400 to be performed with illustrated boxes omitted, with additional boxes added, or with a combination of reordered, omitted, or additional boxes.

Any component or portion of a component designed according to an embodiment of the present invention may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for partitioning memory mapped device configuration space have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the a upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    a first configuration address storage location to store a first pointer to a first memory region to which transactions to configure a first plurality of devices in a partitioned system are addressed;
    an access map storage location to store one of an access map and a pointer to an access map; and
    addressing logic to use the access map to determine whether a configuration transaction from a partition to a first device in the first plurality of devices is to be allowed, the addressing logic including partition identification logic to generate a partition identifier based on the address provided by the configuration transaction and look-up logic to look-up an entry for the first device in the access map and a sub-entry for the partition in the entry.

2. The apparatus of claim 1, further comprising a second configuration address storage location to store to store a second pointer to a second memory region to which transactions to configure a second plurality of devices in the partitioned system are addressed.

3. The apparatus of claim 1, wherein the look-up logic to look-up an entry for the first device in the access map, based on a device identifier provided by the configuration transaction.

4. The apparatus of claim 1, wherein the look-up logic is to look-up a sub-entry for the partition in the entry, and to determine whether the configuration transaction is to be allowed, based on the partition identifier provided by the partition identification logic.

5. A system comprising:
    a first partition including:
        a first device, and
        a first portion of a memory to which transactions to configure the first device are addressed; and
    a second partition including:
        a second device, and
        a second portion of the memory to which transactions to configure the second device are addressed;
    a storage location to store one of an access map and a pointer to an access map; and
    addressing logic to determine whether a device configuration transaction from a processor is to be allowed, based on the access map, the addressing logic including partition identification logic to generate a partition identifier based on the address provided by the device configuration transaction and look-up logic to look-up an entry for the device configuration transaction in the access and a sub-entry for the partition in the entry.

6. The system of claim 5, wherein the look-up logic is to look-up an entry for the device configuration transaction in the access map, based on a device identifier provided by the configuration transaction.

7. The system of claim 5, wherein the look-up logic is to look-up a sub-entry for the partition in the entry, and to determine whether the device configuration transaction is to be allowed, based on the partition identifier provided by the partition identification logic.

* * * * *